United States Patent [19]

Takesue et al.

[11] 4,427,372

[45] Jan. 24, 1984

[54] METHOD AND APPARATUS FOR CONTINUOUSLY BURNING PARTICLES IN AIR STREAM IN A VERTICAL FURNACE

[75] Inventors: Morimasa Takesue; Hiroyasu Otsuka; Hiroyuki Yanagihara, all of Mitaka, Japan

[73] Assignee: Nittetsu Mining Co., Ltd., Tokyo, Japan

[21] Appl. No.: 339,452

[22] PCT Filed: Jun. 1, 1981

[86] PCT No.: PCT/JP81/00121

§ 371 Date: Jan. 6, 1982

§ 102(e) Date: Jan. 6, 1982

[87] PCT Pub. No.: WO81/03437

PCT Pub. Date: Dec. 10, 1981

[30] Foreign Application Priority Data

Jun. 6, 1980 [JP] Japan ................... 55-75522
Jul. 29, 1980 [JP] Japan ................... 55-103166

[51] Int. Cl.³ ............... F27B 15/00; C04B 7/02
[52] U.S. Cl. ........................... 432/14; 106/100; 432/58
[58] Field of Search ............ 432/13, 14, 15, 58; 106/100

[56] References Cited

U.S. PATENT DOCUMENTS 3,584,848 6/1971 Kiyonaga et al. ............... 106/100
3,907,674 9/1975 Roberts et al. .................. 432/15

Primary Examiner—J. Camby
Attorney, Agent, or Firm—Oblon, Fisher, Spivak, McClelland & Maier

[57] ABSTRACT

In a method for continuously burning particles in a gas or oil heated vertical furnace in which the particles are charged from an uppermost part of the space, and the particles bed fluidized by a burning gas flow is formed in a vertically successive downward arrangement and then the burned particles are discharged out of the bottom of the furnace after cooling, the improvement comprises the steps of: providing the furnace with a plurality of downwardly vertically successive zone, including a precipitation zone of the particles at an uppermost part in the furnace, a lower upward flow velocity zone having low upward stream of the burning gas (referred to as "rich fluidized bed", hereinafter) and a higher upward flow velocity zone having high upward stream of the burning gas (referred to as "lean fluidized bed", hereinafter) underneath the precipitation zone wherein the lean fluidized bed is formed beneath and adjacent to the rich fluidized zone, and feeding the particles, burning them successively through the zones provided in said furnace by the burning gas and then discharging the burned particles from the bottom without cooling while being suspended and floated by the upward flow of the burning gas.

And furthermore, an apparatus for continuously burning particles with air stream comprising particles inlet and a particle precipitation chamber provided in the top of a vertical furnace, a large-diameter column and a small-diameter column provided underneath the precipitation column connected by inverted conical section, a burned particle exhaust port formed through the conical section under the small-diameter column, and a plurality of fuel and air or combustion gas inlet provided at the small-diameter column and the conical section.

13 Claims, 1 Drawing Figure

METHOD AND APPARATUS FOR CONTINUOUSLY BURNING PARTICLES IN AIR STREAM IN A VERTICAL FURNACE

DESCRIPTION

TECHNICAL FIELD

The present invention relates to a method of and apparatus for effecting a burning of particles with a continuous flow of gas by means of a vertical furnace.

BACKGROUND ART

It has been proposed to burn particles such as artificial light-weight aggregates, powdered lime stones, powdered dolomite and so forth by means of a vertical furnace employing an upward flow of gas such as a combustion gas which forms various beds of the particles such as fluidized bed, jetting flow bed, improved jetting flow bed, swirling flow bed, loaded moving bed and the like.

The present inventors have already noticed the following facts in the burning of particles. In the burning of the artificial light-weight aggregates, the agglomeration by fusing of the particles takes place easily because the bloating temperature of the particles approximates the fusion temperature thereof. This problem is serious particularly when the burning is made by means of a rotary kiln, namely, in such a case, the heating of the particles due to the heat from the kiln wall, and the particles are gradually moved toward the kiln outlet while being agitated only insufficiently. Due to the radiant heat from the kiln wall and the insufficient agitation of the particles, the agglomeration by fusing of the particles is liable to occur, resulting not only in the unsmooth operation of the apparatus but also in a lowered thermal efficiency.

For effectively burning the light-weight aggregate by a rotary kiln, it is necessary to make the particles stay in the kiln for a comparatively long time which generally falls between 20 and 60 minutes. Partly because of this reason and partly because of the heat transfer mechanism as stated above, the particles of particle size less than 5 mm tend to be lost bloating element by oxidation or due to fusion, although comparatively coarse particles of mean particle size exceeding 5 mm can provide a specific gravity of 1.25 to 1.35 of the burned product. Thus, it is not possible to obtain a burned product having a specific gravity smaller than 1.55, with the fine particles having a mean particle size below 5 mm.

Generally, in the burning of the light-weight aggregate, it is said that a operation has to be made through a minute temperature control within the temperature error of 10° C. at a high temperature region in excess of 1100° C. to prevent the fusion of the burned products. It is prohibited to discharge the product to the outside of the furnace in a stacked manner or to cool the hot burned product in a stacked state, because the fusion of the burned particles is liable to occur due to a confinement of the heat.

With these knowledges, the present inventors have made various studies for the possibility of burning of particles with a gas stream by a vertical furnace which is considered to have a large rate of heat transfer and, hence, a reduced tendency of agglomeration of the burned particles.

Hitherto, various methods have been proposed for burning particles with gas flows in vertical furnace, as summarized below.

(1) Namely, Japanese Patent Publication No. 48076/1974 discloses a batch type method in which coarse particles having particle size in excess of 5 mm are supplied into a furnace and are burned while being suspended, fallen and circulated by an upward swirling flow of hot gas, and the burned product is discharged from the lower side of the furnace.

(2) Japanese Patent Laid-open No. 121807/1978 discloses a technique in which the particles are fluidized by an upward flow of gas which has passed through a rectifying plate (a perforated plate), and the burning treatment is conducted continuously with the supply of a material for adjusting the temperature in the furnace to avoid the fusion of the burned particles. The burned particles overflow the fluidized bed and are discharged continuously.

(3) A plurality of rectifying plates for upward flow of gas are disposed in the furnace to form a plurality of stages of fluidized bed, so that the particles overflow from each stage to fall onto the underlying bed while being successively subjected to a pre-heating, burning, and cooling, so that the burned product is stacked on the bottom of the furnace. The product is discharged while being cooled by the air to pre-heat the air conveyed into the furnace for burning.

(4) As disclosed in Japanese Patent Laid-open No. 68796/1979, an improved jetting bed is formed in a furnace by an upward flow of gas which has passed through a rectifying plate to effect the burning continuously while permitting the overflow of the burned particles from the bed for the discharge.

(5) The fluidized beds of the particles are formed without any assist of the perforated rectifying plate as used in the prior arts (2),(3) and (4) stated above. The thickness or density of the particles is greater in the lower stage than in the upper stage of the fluidized bed. The burned products are stacked on the bottom of the furnace and discharged from the latter. Other techniques proposed hitherto are more or less applications, improvements, or modifications of these five techniques summarized heretofore.

The present inventors have found that these conventional techniques, either solely or in combination, cannot satisfy the following requirements (a) to (c).

(a) To obtain a condition for satisfactorily avoiding the agglomeration of the burned particles.

(b) To obtain a sufficiently high thermal efficiency. In the conventional methods summarized above, the thermal efficiency is inevitably low because the gas is discharged at a high temperature substantially equal to the burning temperature.

(c) To obtain a large treating capacity of the furnace per unit volume.

DISCLOSURE OF THE INVENTION

The present inventors have made an intense study for improving the technique for burning light-weight aggregate and have reached the following conclusions.

(1) In forming a fluidized bed of the particles by the upward flow of gas within the furnace, the density of the particles is made smaller in the region where the flow rate of the upward flow of gas is higher, while, in the region of low rate, the density of the particles becomes greater. With this knowledge, it is possible to form a temperature gradient in the gas and in the particles by forming successive beds of different densities of the particles in the vertical direction during the burning.

(2) It is possible to arrange such that a region of the maximum temperature is formed as the fluidized bed of lowest density of the particle is burned, and that the burned particles are discharged from the bottom of furnace to the outside of the latter after being suspended and floated by the upward flow of gas through the region of maximum temperature. This arrangement permits an easy adjustment of the temperature in the furnace and facilitates the prevention of agglomerating of the burned particles, while improving the burning capacity per unit volume of the furnace.

The present invention has been achieved on the basis of these facts. Namely, in a method for continuously burning particles in a gas or oil heated vertical furnace in which the particles are charged from an uppermost part of the space, the particles bed fluidized by a burning gas flow is formed in a vertically successive downward arrangement, and the burned particles are discharged out of the bottom of the furnace after cooling, the improvement comprises the steps of: providing the furnace with a plurality of downwardly vertically successive zone, including a precipitation zone of the particles at an uppermost part in the furnace, a lower upward flow velocity zone having low upward stream of the burning gas (referred to as "rich fluidized bed", hereinafter) and a higher upward flow velocity zone having higher upward stream of the burning gas (referred to as "lean fluidized bed", hereinafter) underneath the precipitation zone wherein the lean fluidized bed is formed beneath and adjacent to the rich fluidized zone, and feeding the particles, burning them successively through the zones provided in said furnace by the burning gas and then discharging the burned particles from the bottom without cooling while being suspended and floated by the upward flow of the burning gas.

And furthermore, an apparatus for continuously burning particles with air stream comprising particles inlet and a particle precipitation chamber provided in the top of a vertical furnace, a large-diameter column and a small-diameter column provided underneath the precipitation column connected by inverted conical section, a burned particle exhaust port formed through the conical section under the small-diameter column, and a plurality of fuel and air or combustion gas inlet provided at the small-diameter column and the conical section.

An object of the invention is to make it possible to effect a burning of particles which tends to be agglomerated at high temperature, such as light-weight aggregate. A further object of the invention is to improve the thermal efficiency and burning capacity per volume of the furnace. The method and apparatus of the invention can apply also to the burning of other similar particles, such as powdered lime stones, dolomite, and so forth.

Throughout the specification, the term "fluidized bed" is used to denote the bed or layer formed in a vertically elongated substantially tubular furnace where the particles are fluidized by the upward flow of gas and suspended, circulated, or made to flow by the upward flow of gas.

BRIEF DESCRIPTION OF THE DRAWING

The attached sole FIGURE is a vertical sectional view of a vertical furnace for burning particles in a flow of gas, constructed in accordance with an embodiment of the invention.

BEST MODE FOR CARRYING OUT THE INVENTION

Figure 1:
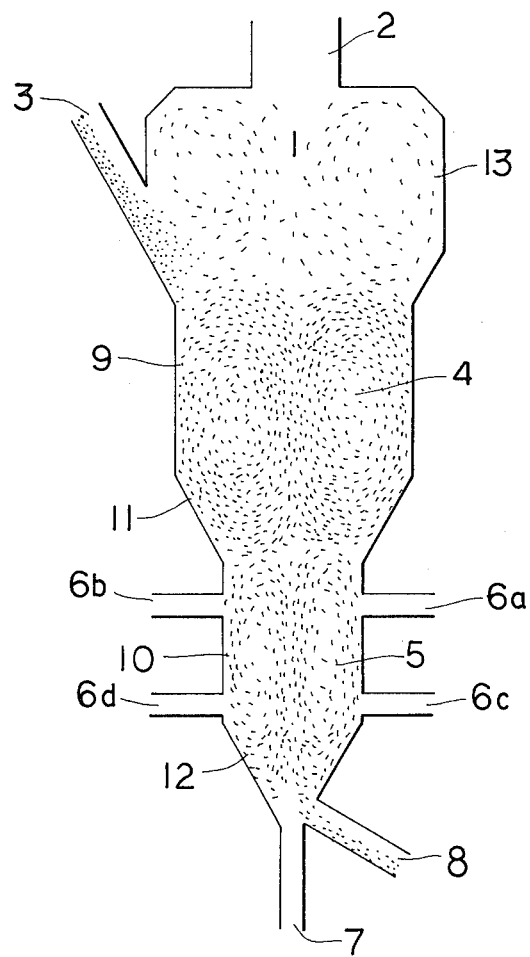

The invention will be fully understood from the following description of the preferred embodiment taken in conjunction with the accompanying drawings.

Referring to the drawings, a vertical furnace 1 for burning particles by the upward flow of a gas has a vertically elongated substantially tubular shape. As will be clearly seen from FIG. 1, the furnace 1 is provided at its top portion with a gas discharge opening 2, and particles are supplied from an opening 3 at its upper portion. A reference numeral 13 designates a falling chamber. An upward opening 7 for supplying a fuel for burning together with air and/or burning gas (referred to as "fuel and so forth", hereinafter) is formed at a lower portion of the furnace 1. Reference numerals 9 and 10 denote large-diameter cylindrical portion and small-diameter cylindrical portion which are formed beneath and adjacent to the falling chamber 13. The large-diameter cylindrical portion is connected to the small-diameter cylindrical portion 10 through an inverted conical portion 11. Similarly, the small-diameter cylindrical portion 10 is connected to the gas supplying opening 7 through an inverted conical portion 12. It is to be understood that the circular cross-sections of the cylindrical and conical portions are not essential. Namely, the cylindrical and inverted conical portions can have a polygonal cross-section. In consequence, the velocity of the upward flow of the gas is lower at the large-diameter cylindrical portion 9 and higher at the small-diameter cylindrical portion 10. Consequently, as explained before, a fluidized bed 4 (rich fluidized bed) of a large density of particles and a fluidized bed 5 (lean fluidized bed) of a small density of particles are formed in series in the large-diameter cylindrical portion 9 and in the small-diameter cylindrical portion 10, respectively.

In these fluidized beds 4 and 5 formed successively in the vertical direction, the lengths of stay of the particles during constant state of heating and burning conditions are different. In addition, there is a difference in the rate of suspension, circulation, and flowing of the particles between these two portions, partly because of the difference in the length of stay of the particles and partly because of the action of the inverted conical portion 11. Namely, this arrangement creates such a state that the particles are mixed imperfectly throughout the upper and lower fluidized beds.

In the fluidized beds in the prior arts such as those disclosed in Japanese Patent Laid-open Nos. 121807/1978 and 68796/1979, there is an essential requisite that the operation is made such that the ratio U/Ut between the mean upward component velocity U of the fluidized bed and the terminal velocity Ut of the particles falls between 0.1 and 0.3, to ensure a perfect mixing of the particles to achieve a uniform temperature distribution throughout the fluidized bed. In contrast to the above, according to the invention, the operation is made such that the ratio U/Ut takes a value between 0.2 and 0.6 and a value between 0.4 and 1.0, respectively, in the rich fluidized bed and in the lean fluidized bed.

Therefore, when burning is effected with the furnace of the invention, supposing that the fluidized bed 5 is the core of heating (zone of highest temperature in the process of burning and bloating of light-weight aggregate), a temperature difference is created between the two fluidized beds 4 and 5, partly because of the difference in the amount of stay of the particles and partly because of a difference in the amount of heat transfer attributable to the change in the flow velocity. Namely, in the constant state condition of operation, a temperature gradient is created in the direction of the height of the furnace, even though the fluidized beds 4 and 5 are formed continuously and integrally. In consequence, the temperature of the gas discharged from the fluidized bed 4 is lowered to reduce the fuel consumption.

In the furnace of the invention in which the particles are mixed imperfectly in the upper and lower fluidized beds, the discharge of the burned particle is effected not in a overflowing manner due to perfect mixing as in the prior art disclosed in Japanese Patent Laid-open No. 121807/1978 but due to a piston-flow effect, i.e. by an assist of a displacement flow, because the burned particles are discharged from the bottom of the furnace. In consequence, the period of stay, i.e. the length of stay, of the particles in the furnace is decreased and the nonuniformity of the burning is depressed. In addition, due to an increased heat exchange between the gas and the particles, the burning capacity per unit volume of the furnace is increased.

According to the invention, the flow velocity of the fluidized beds formed during burning is much greater than that in the prior art so that the fluidized beds are comparatively lean as a whole. Particularly, the flow velocity is high and the density of the particle is low in the lower fluidized bed 5. In consequence, it is possible to obtain a greater agitating effect and, hence, to suppress the undesirable agglomeration of the burned particles. According to the invention, therefore, it is possible to bloat the light-weight aggregate by a treatment conducted at a comparatively high temperature, without addition of any agent for preventing the fusion, even if the particles have an appreciable tendency for fusion. This in turn permits the production of light-weight aggregate having smaller specific gravity. In addition, since the burning is conducted in the floated and suspended state of the particles, it is possible to treat spheroidized materials without the fear of thermal destruction.

According to the invention, it is essential that the angle of upward divergence of the inverted conical portions 11 and 12 is less than 90°, for otherwise the particles stick to the inner surfaces of the inversed conical portions to cause undesirable agglomeration by fusing of the particles. In order to ensure the sliding down of the particles along the tapered surfaces of the inversed conical portion, the upward divergence angle is preferably selected to fall below 60°.

Referring again to FIG. 1, reference numerals 6a to 6d designate radially oriented ports for feeding the fuel and so forth, formed in the wall of the furnace 1. Burners or the like means are inserted in these ports to form the temperature gradients mentioned before and to adjust the maximum temperature. It is not essential that these ports are formed in the small-diameter cylindrical portion 10. Namely, provided that the burning condition allows, the ports may be formed in the inverted conical portions 11 and 12.

In FIG. 1, a reference numeral 8 designates an opening for discharging the burned particles. In the burning of the particle in the furnace of the invention, the particle supplied through the opening 3 are discharged through the discharge opening 8 formed at the bottom of the furnace, after a temporary stay in the fluidized beds, as will be understood from the following description.

The particles supplied to the fluidized bed 4 are burned as they stays in the furnace while being fluidized, circulated, and floated within the fluidized beds 4 and 5. In the furnace of the invention, since the falling chamber 13 is formed at an upper portion of the large-diameter cylindrical portion 9, a part of the particles conveyed by the upward flow can fall onto the fluidized bed and is made to stay in the latter. However, the part of the particles having smaller particle size which exceed the terminal velocity Ut of the upward flow is conveyed to the outside of the furnace together with the exhaust gas. The falling of the particles takes place at a rate corresponding to the loss of balance between the pressure drop of the upward gas flow and the amount of stay of the particles expressed by the following equation, and the particles thus fallen are discharged to the outside of the furnace from the bottom 8 of the latter.

W (amount of particles staying in furnace)
= $\Delta P$ (pressure drop between fluidized beds 4 and 5)
$\Delta A$ (mean cross-sectional area of the second frusto-conical zone (11) of the furnace)

Where, W represents the amount of particles staying in the furnace, while $\Delta P$ represents the pressure drop caused by the particles staying in the fluidized beds 4 and 5. Also, A represents the cross-sectional area of the furnace equivalent to the state of balance between the amount W of stay of particles and the pressure drop $\Delta P$.

In consequence, in the burning conducted by the furnace of the invention, it is possible to continuously supply the particle and to continuously discharge the burned product, through a control of the supplying rate solely.

In the present invention, the operation is made at a gas velocity higher than the velocity $U_{mf}$ at which the particle starts to fluidize, because of the mean velocity of the upward gas flow in the fluidized beds as stated before. In addition, the discharge of the burned particle is not made by the overflowing which takes place in the conventional method. According to the invention, in spite of these facts, it is possible to make the burned particles fall through the fluidized beds and be discharged from the bottom of the furnace. This is attributable, according to the knowledge of the present inventors, to the above-mentioned unbalance between the pressure drop and the length of stay of the particle in the furnace, and also to the difference in flow velocity of the upward flow of gas in the central part and the inside peripheral part of the furnace.

In the method of the invention, it is necessary to select a suitable length of stay of particles corresponding to the optimum period of stay, in accordance with the particle size of the particles. This can be achieved by suitably controlling the $\Delta P$ (pressure drop between fluidized beds) by means of a gas draft fan (not shown in the figure) capable of adjusting the draft or suction force.

The reference numeral 7 designates an opening for supplying and directing the fuel or the like upwardly from the bottom of the furnace. This is essential for forming the upward gas flow for supporting the fluidized bed 5, as well as for adjusting the temperature of the fluidized bed 5 and also for suspending the burned particles falling down from the fluidized beds. The burned product is discharged through the discharge opening 8.

As has been described, the major object of the present invention is efficiently burning such light-weight aggregates as would easily cause the agglomeration by fusing during or after bloating and burning. For this end, according to the invention, a temperature gradient is created between the rich fluidized bed 4 and the lean fluidized bed 5 which constitutes the region of the highest temperature. It is also necessary to promptly discharge the burned product without permitting it to accumulate, in order to prevent the undesirable agglomeration by fusing. If a large vacuum is generated in the region around the discharge opening 8, the ambient air or the like atmosphere is induced into the furnace to cool the fluidized bed 5 so that the region of the maximum temperature is shifted to the area near the inverted conical portion 11 or the fluidized bed 4 to seriously hinder the control of the temperature distribution in the furnace. This also affects adversely the pressure drop between the fluidized beds and the length of stay of the particles, as well as the falling down of the burned particles, to unstabilize the pressure balance system. It is, therefore, advisable to adjust a static pressure in the region around the discharge opening approximating the atmospheric pressure. This adjustment of the static pressure is achieved through obtaining a balance between the feeding pressure of the fuel, air and the like and the draft produced by the draft fan.

INDUSTRIAL APPLICABILITY

The present invention is characterized by the following features (1) to (4).

(1) The rich and lean fluidized beds are formed in series in the vertical direction due to the presence of the large-diameter cylindrical portion and the small-diameter cylindrical portion which are connected in series through an inverted conical portion, so that it is possible to effect the burning while forming a temperature gradient. It is, therefore, possible to effect the burning continuously and integrally because the division into a plurality of separate stages of fluidized beds as employed in the prior art can be eliminated.

(2) The particle flow generally takes the form of a piston flow, and the upward gas flow is generally in the form of a counter current.

(3) The burned particles are discharged, not by overflowing, but through a falling directly through the region of the highest temperature in the furnace, and the burned particles are taken out of the furnace from the bottom of the latter.

(4) The falling chamber is formed at an uppermost part of the space in the furnace.

These features in combination offer the following advantageous and industrial advantages.

(a) It is easy to stabilize the furnace temperature and other operation factors.

(b) It is possible to burn particles having particle size below 5 mm safely without using any preventing agent for agglomeration by fusing of the burned particles, and to obtain light-weight aggregates having a smaller specific gravity.

(c) The fuel consumption is much reduced.

(d) The burning capacity per unit volume of furnace is increased.

(e) In the prior art method in which the burned product is discharged by overflowing, it is extremely difficult to discharge small pieces of burned product accidentally formed by agglomeration by fusing of particles. However, according to the invention, the discharge of such a small piece can be made automatically because the discharge is made directly through the bottom of the furnace, even if such small pieces are formed.

EXAMPLE

An experimental burning of a light-weight aggregate was conducted by means of a furnace having a construction similar to that shown in FIG. 1. The inside diameter of the falling chamber 13, cylindrical portion 9 and the cylindrical portion 10 were 200 mm, 130 mm and 70 mm, respectively. The angle of upward divergence of the inversed conical portion 11 was 45°. The total height of the fluidized beds 4 and 5 was about 470 mm. The furnace had three ports formed in the side wall for supplying the fuel and so forth, as well as an opening 7 for supplying fuel and so forth and an opening 8 for discharging the burned products formed in the bottom thereof. The result of this experimental burning is shown in Table 1 below.

The particles were shale pulverized or spheroidized by crushing and were formed into particle sizes falling between 1.2 and 3.3 mm. Most of the burned product was discharged and collected from the opening 8 formed in the bottom of the furnace, while the remainder was discharged from the gas discharge opening 2 formed in the top of the furnace and collected by means of a cyclone (not shown in the FIGURE). As will be understood from Table 1, according to the invention, the temperature of the exhaust gas (temperature of gas at the uppermost part of the fluidized bed 4) was lowered to a level below the burning temperature (highest temperature in the fluidized bed 5). The rate of production of burned particles per unit volume was as high as 634 kg/m$^3$.Hr. For comparison, the rate of production is as low as 40 to 60 kg/m$^3$.Hr in the conventional rotary kilns and 200 kg/m$^3$.Hr at the greatest in other known apparatus of fluidized bed type furnace.

Also, the specific gravity of the product was as small as 1.35, although no material nor additive was used for preventing the agglomeration by fusing.

TABLE 1

| items | result | |
|---|---|---|
| particles supply rate (kg/Hr) | 14.5 | |
| max. temp. in fluidized bed 5° C. | 1150 | |
| temp. at uppermost part of fluidized bed 4° C. | 1030 | |
| pressure drop between fluidized beds mmAq | 160 | |
| amount of fuel LNG m$^3$/kg burned particles | 0.279 | |
| mean period of stay min. | 6.1 | |
| average weight of the particles in suspension in the furnace at any given instant kg | 1.33 | |
| discharge rate of burned product kg/Hr | 13.0 | 11.0 at bottom 2.0 at cyclone |
| discharge rate/furnace volume kg/m$^3$.Hr | 634 | |
| specific gravity of burned product | 1.35 | |
| agent or additive for preventing agglomeration by fusing of burned particle | none | |

What is claimed is:

1. A vertical furnace for continuously burning particles, said furnace comprising:
   (a) a vertically elongated substantially tubular structure defining, in a vertically successive downward arrangement:

(i) a precipitation chamber formed from imperforate vertical walls, said precipitation chamber having a first cross-sectional area;

(ii) imperforate walls forming a first frusto-conical zone connecting said precipitation chamber to the next lower chamber;

(iii) a rich fluidized bed chamber formed from imperforate vertical walls, said rich fluidized bed chamber having a second cross-sectional area;

(iv) imperforate walls forming a second frusto-conical zone connecting said rich fluidized bed chamber to the next lower chamber;

(v) a lean fluidized bed chamber formed from imperforate vertical walls, said lean fluidized bed chamber having a third cross-sectional area; and (vi) imperforate walls forming a third frusto-conical zone connecting said lean fluidized bed chamber to the bottom of said tubular structure;

(b) a gas discharge opening at the top of said precipitation chamber;

(c) a particle inlet port in said precipitation chamber or said first frusto-conical zone;

(d) a vertically oriented inlet port for gas and/or a burnable fuel at the bottom of said third frusto-conical zone;

(e) at least one inlet port for gas and/or a burnable fuel in said lean fluidized bed chamber, said second frusto-conical zone, or said third frusto-conical zone; and (f) a burned particle discharge port at the bottom of said third frusto-conical zone, wherein:

(g) said first cross-sectional area is larger than said second cross-sectional area, and said second cross-sectional area is larger than said third cross-sectional area and (h) there are no inlet ports for gas and/or a burnable fuel in said rich fluidized bed chamber, said first frusto-conical zone, or said precipitation chamber, whereby:

(i) said lean fluidized bed chamber is the zone of highest temperature and the temperature within the furnace decreases vertically from said lean fluidized bed chamber;

(j) the velocity of the gas in said lean fluidized bed chamber is higher than the velocity of the gas in said rich fluidized bed chamber, and the velocity of the gas in said rich fluidized bed chamber is higher than the velocity of the gas in said precipitation chamber; and (k) the density of the particles in said lean fluidized bed chamber is lower than the density of the particles in said rich fluidized bed chamber.

2. A vertical furnace as recited in claim 1 wherein said vertically elongated substantially tubular structure is circular in cross-section.

3. A vertical furnace as recited in claim 1 wherein said vertically elongated substantially tubular structure is polygonal in cross-section.

4. A vertical furnace as recited in claim 1 wherein the angles of upward divergence of said first, second, and third frusto-conical zones are less than 90%, whereby particles are prevented from sticking to the inner surfaces of said zones.

5. A vertical furnace as recited in claim 4 wherein the angles of upward devergence of said first, second, and third frusto-conical zones are less than 60%, thereby ensuring the sliding down of the particles along the tapered inner surface of said zones.

6. A vertical furnace as recited in claim 1 wherein the dimensions of the various parts of said vertically elongated substantially tubular structure are chosen such that the ratio between the mean velocity of the gas and the terminal velocity of the particles is between 0.2 and 0.6 in said rich fluidized bed and between 0.4 and 1.0 in said lean fluidized bed.

7. A vertical furnace as recited in claim 1 wherein a plurality of axially spaced inlet ports for gas and/or a burnable fuel are provided in said lean fluidized bed chamber, said second frusto-conical zone, and/or said third frusto-conical zone, whereby the maximum temperature in said lean fluidized bed and the axial gradient of the temmperature can be adjusted.

8. A vertical furnace as recited in claim 7 and further comprising a burner inserted in each of said plurality of axially spaced inlet ports for gas and/or a burnable fuel.

9. A vertical furnace in claim 1 and further comprising a burner inserted in said inlet port for gas and/or a burnable fuel.

10. A vertical furnace as recited in claim 1 wherein said at least one inlet port for gas and/or a burnable fuel in said lean fluidized bed, said second frusto-conical zone, or said third frusto-conical zone is radially oriented.

11. A vertical furnace as recited in claim 1 wherein said vertically oriented inlet port for gas and/or a burnable fuel is centrally disposed at the bottom of said third frusto-conical zone.

12. A method for continuous burning particles in a furnace comprising:

(a) a vertically elongated substantially tubular structure defining, in a vertically successive downward arrangement:

(i) a precipitation chamber formed from imperforate vertical walls, said precipitation chamber having a first cross-sectional area;

(ii) imperforate walls forming a first frusto-conical zone connecting said precipitation chamber to the next lower chamber;

(iii) a rich fluidized bed chamber formed from imperforate vertical walls, said rich fluidized bed chamber having a second cross-sectional area;

(iv) imperforate walls forming a second frusto-conical zone connecting said rich fluidized bed chamber to the next lower chamber;

(v) a lean fluidized bed chamber formed from imperforate vertical walls, said lean fluidized bed chamber having a third cross-sectional area; and (vi) imperforate walls forming a third frusto-conical zone connecting said lean fluidized bed chamber to the bottom of said tubular structure;

(b) a gas discharge opening at the top of said precipitation chamber;

(c) a particle inlet port in said precipitation chamber or said first frusto-conical zone;

(d) a vertically oriented inlet port for gas and/or a burnable fuel at the bottom of said third frusto-conical zone;

(e) at least one inlet port for gas and/or a burnable fuel in said lean fluidized bed chamber, said second frusto-conical zone, or said third frusto-conical zone; and (f) a burned particle discharge port at the bottom of said third frusto-conical zone, wherein:

(g) said first cross-sectional area is larger than said second cross-sectional area, and said second cross-sectional area is larger than said third cross-sectional area; and (h) there are no inlet ports for gas and/or a burnable fuel in said rich fluidized bed chamber, said first frusto-conical zone, or said precipitation chamber, said method comprising the step of controlling the input of gas through said vertically oriented inlet port and said at least one inlet port in said lean fluidizied bed chamber, said second frusto-conical zone, or said third frusto-conical zone and the input of particles through said particles inlet port such that:

(i) said lean fluidized bed chamber is the zone of highest temperature and the temperature within the furnace decreases vertically from said lean fluidized bed chamber;

(j) the velocity of the gas in said lean fluidized bed chamber is higher than the velocity of the gas in said rich fluidized bed chamber, and the velocity of the gas in said rich fluidized bed chamber is higher than the velocity of the gas in said precipitation chamber; and (k) the density of the particles in said lean fluidized bed chamber is lower than the density of the particles in said rich fluidized bed chamber.

13. A method as recited in claim 12 and further comprising the step of controlling the input of gas through said vertically oriented inlet port and said at least one inlet port in said lean fluidized bed chamber, said second frusto-conical zone, or said third frusto-conical zone and the input of particles through said particle inlet port such that the ratio between the mean velocity of the gas and the terminal velocity of the particles is between 0.2 and 0.6 in said rich fluidized bed and between 0.4 and 1.0 in said lean fluidized bed.

* * * * *